(12) United States Patent
Buerger

(10) Patent No.: US 11,433,930 B2
(45) Date of Patent: Sep. 6, 2022

(54) METHOD FOR CONTACTLESSLY CAPTURING A TRACK GEOMETRY

(71) Applicant: Plasser & Theurer Export von Bahnbaumaschinen GmbH, Vienna (AT)

(72) Inventor: Martin Buerger, Linz (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 627 days.

(21) Appl. No.: 16/477,991

(22) PCT Filed: Jan. 5, 2018

(86) PCT No.: PCT/EP2018/050227
§ 371 (c)(1),
(2) Date: Jul. 15, 2019

(87) PCT Pub. No.: WO2018/145829
PCT Pub. Date: Aug. 16, 2018

(65) Prior Publication Data
US 2020/0122753 A1 Apr. 23, 2020

(30) Foreign Application Priority Data
Feb. 7, 2017 (AT) .................... A 39/2017

(51) Int. Cl.
*B61K 9/08* (2006.01)
*E01B 35/00* (2006.01)
(Continued)

(52) U.S. Cl.
CPC .............. *B61K 9/08* (2013.01); *E01B 35/00* (2013.01); *B61L 15/0081* (2013.01);
(Continued)

(58) Field of Classification Search
CPC ....... B61K 9/08; E01B 35/00; E01B 2203/16; E01B 35/06; B61L 15/0081; B61L 23/047; G01B 11/255
See application file for complete search history.

(56) References Cited

U.S. PATENT DOCUMENTS 7,979,995 B2 7/2011 Theurer et al.
9,518,845 B2 12/2016 Lichtberger
(Continued)

FOREIGN PATENT DOCUMENTS

AT 514502 A1 1/2015
CA 2489980 A1 6/2005
(Continued)

OTHER PUBLICATIONS

International Search Report of PCT/SP2018/050227, dated Mar. 14, 2018.
(Continued)

*Primary Examiner* — Robert G Bachner
(74) *Attorney, Agent, or Firm* — Collard & Roe, P.C.

(57) ABSTRACT

The invention relates to a method for contactless recording of a track geometry of a track by means of a rail vehicle which is moved along the track on on-track undercarriages (4), wherein profile data of the track extending in transverse direction are compiled by means of a laser scanner. In this, it is provided that, by means of an evaluation device, profile data are evaluated relative to a reference base pre-defined on the rail vehicle in order to derive from this the course of a track central axis and/or a rail. The invention additionally relates to a rail vehicle which comprise an evaluation device configured for carrying out the method. Thus, no further measuring system is required to determine a track position.

9 Claims, 2 Drawing Sheets

(51) Int. Cl.
  B61L 15/00 (2006.01)
  B61L 23/04 (2006.01)
  G01B 11/255 (2006.01)

(52) U.S. Cl.
  CPC ......... *B61L 23/047* (2013.01); *E01B 2203/16* (2013.01); *G01B 11/255* (2013.01)

(56) References Cited

U.S. PATENT DOCUMENTS

| | | | |
|---|---|---|---|
| 10,309,763 | B2 | 6/2019 | Shiraishi et al. |
| 2002/0176608 | A1 | 11/2002 | Rose |
| 2005/0140144 | A1* | 6/2005 | Kumar ................... B61C 15/10 291/2 |
| 2009/0073428 | A1 | 3/2009 | Magnus et al. |

FOREIGN PATENT DOCUMENTS

| | | |
|---|---|---|
| CN | 1499011 A | 5/2004 |
| CN | 101765689 A | 6/2010 |
| CN | 203128962 U | 8/2013 |
| CN | 105220589 A | 1/2016 |
| CN | 105960490 A | 9/2016 |
| CN | 106080662 A | 11/2016 |
| CN | 106087621 A | 11/2016 |
| DE | 3444723 A1 | 6/1986 |
| DE | 19801311 A1 | 5/1999 |
| DE | 10 2014 217 954 A1 | 3/2016 |
| DE | 102014217954 A1 | 3/2016 |
| EP | 1020563 A1 | 7/2000 |
| FR | 2890086 A1 | 3/2007 |
| JP | H05248866 A | 9/1993 |
| JP | H0875423 A | 3/1996 |
| WO | 2008/122319 A1 | 10/2008 |
| WO | 2015/124253 A1 | 8/2015 |
| WO | 2016/021224 A1 | 2/2016 |

OTHER PUBLICATIONS

Chinese Office Action in Chinese Application No. 201880010044.9 dated Sep. 2, 2020.
Indian Office Action in Indian Application No. 201927028201 dated Mar. 15, 2021 with English translation.

* cited by examiner

METHOD FOR CONTACTLESSLY CAPTURING A TRACK GEOMETRY

CROSS REFERENCE TO RELATED APPLICATIONS

This application is the National Stage of PCT/EP2018/050227 filed on Jan. 5, 2018, which claims priority under 35 U.S.C. § 119 of Austrian Application No. A 39/2017 filed on Feb. 7, 2017, the disclosure of which is incorporated by reference.

FIELD OF TECHNOLOGY

The invention relates to a method for contactless recording of a track geometry of a track by means of a rail vehicle which is moved along the track on on-track undercarriages, wherein profile data of the track extending in transverse direction are compiled by means of a laser scanner. The invention also relates to a rail vehicle for carrying out the method.

PRIOR ART

For maintenance of the permanent way of a track, regular checks are required. To that end, the track is traversed at regular intervals with a track measuring device in the shape of a track measuring vehicle which records the track geometry in order to subsequently evaluate the same. Since the track geometry has a direct effect on the riding dynamics of a vehicle traveling on rails, these measurements are decisive for the evaluation of railway safety. Therefore, track measuring vehicles have long been known.

Frequently, measuring systems having mechanical sensors are used which, by way of movable spot feelers, are in constant contact with the track. From the movement of the sensors, it is then possible to derive the track geometry.

Also, measuring devices having measuring chords are known from the prior art, for example from EP 1 020 563 A1. For measuring the actual position of a track, three measuring points are registered on the track via on-track undercarriages (measuring trolleys). For the measurement, a measuring chord is stretched between the front and the rear measuring trolley. Via the central measuring trolley, the deflection of the chord and thus the actual position of the track is registered. Due to the sensors being in constant contact with the track, these measuring systems reach their limits quickly, especially at higher speeds.

AT 514 502 A1 describes a measuring system in which a rotating laser moved continuously along the track is used for determining the position of a track fixed point. On the basis of a distance to a recognized fixed point, an actual position of the track traced by means of an on-track undercarriage is evaluated with reference to a target position. However, as a result of the requirement of the reference points next to the track, this measuring system entails great complexity.

SUMMARY OF THE INVENTION

It is the object of the invention to provide an improvement over the prior art for a method of the type mentioned at the beginning. A further object lies in showing a rail vehicle for carrying out the method.

According to the invention, these objects are achieved by way of a method according to claim 1 and a rail vehicle according to claim 9. Dependent claims indicate advantageous embodiments of the invention.

The invention provides that, by means of an evaluation device, the profile data are evaluated relative to a reference base pre-defined on the rail vehicle in order to derive from this the course of a track central axis and/or a rail. As a result, there is no necessity of a further measuring system to determine a track position. Merely the profile data of the track picked up by means of the laser scanner are evaluated in order to derive from this the course of the track or the rails. In this, a corresponding reference system is specified on the rail vehicle. In this manner, by attaching a laser scanner, almost any rail vehicle can be used for track measurement.

In an advantageous embodiment of the invention, it is provided that a reference plane, aligned with pivot points of the on-track undercarriages and with the laser scanner, is specified as reference base, that a displacement of the reference plane relative to a rail edge point is determined from the profile data, and that from this, and from distances between the pivot points of the on-track undercarriages and the laser scanner, a curvature or a curvature radius of a track curve is derived. For many applications, a reference system formed by the pivot points of the rail vehicles is sufficiently precise, so that no further measuring components are necessary for the method.

An advantageous further development provides that the position of the pivot points of the on-track undercarriages relative to the rails of the track is continuously recorded. With this, small deviations of the pivot points with respect to the track center axis are detected. These can occur, for example, due to pendulum motions or a wheel suspension. The compensation of these deviations leads to increased precision when determining the track geometry.

It is additionally advantageous if the reference plane is specified as a plane through a laser scanner axis and through the pivot points. This results in a simpler and quicker computation of the track position.

In this, a further improvement provides that the position of a rail edge point is determined for each rail, and that from this the displacement of the reference plane relative to the track center axis is determined. The displacement (offset) is a dimension easy to measure, from which the curvature of a track curve can be derived via geometric relationships.

An advantageous further development exists if a reference plane of the track determined by several rail edge points is prescribed, and if a track super-elevation is derived from a deviation of the reference base from said reference plane. Thus it is possible in a simple manner to derive the track super-elevation from a displacement of the reference system (for example, vertical laser scanner axis) relative to the reference plane while taking into account an inclination of the superstructure.

In this, it is advantageous if a vertical plane extending symmetrically between the rail edge points is specified as reference plane. This reference plane moves along continuously with the rail vehicle in the travel direction and reflects in a simple manner the current track position with regard to the reference base.

Optionally, it is provided that an inclination of the superstructure is detected by means of an inclinometer. In this way, a precise determination of a track super-elevation is possible with little computing expense.

A rail vehicle according to the invention for continuous contactless recording of a track geometry of a track comprises a laser scanner, arranged on the rail vehicle, for the recording of profile data of the track extending in the transverse direction, and an evaluation device configured for carrying out one of the above-mentioned methods. A rail vehicle of this kind delivers with simple means sufficiently precise measurement results, wherein even conventional rail vehicles can be employed as measuring vehicles.

An advantageous further development provides that the laser scanner is designed as an element of a laser measuring system used for further evaluations. Thus, rail vehicles already equipped with laser scanners can be upgraded and used for the new optical measuring method. By attachment of a laser scanner, locomotives, traction vehicles or wagons can be used for track measurement.

BRIEF DESCRIPTION OF THE DRAWINGS

The invention will be described by way of example below with reference to the attached figures. There is shown in schematic representation in.

DESCRIPTION OF THE EMBODIMENTS

Figure 1:
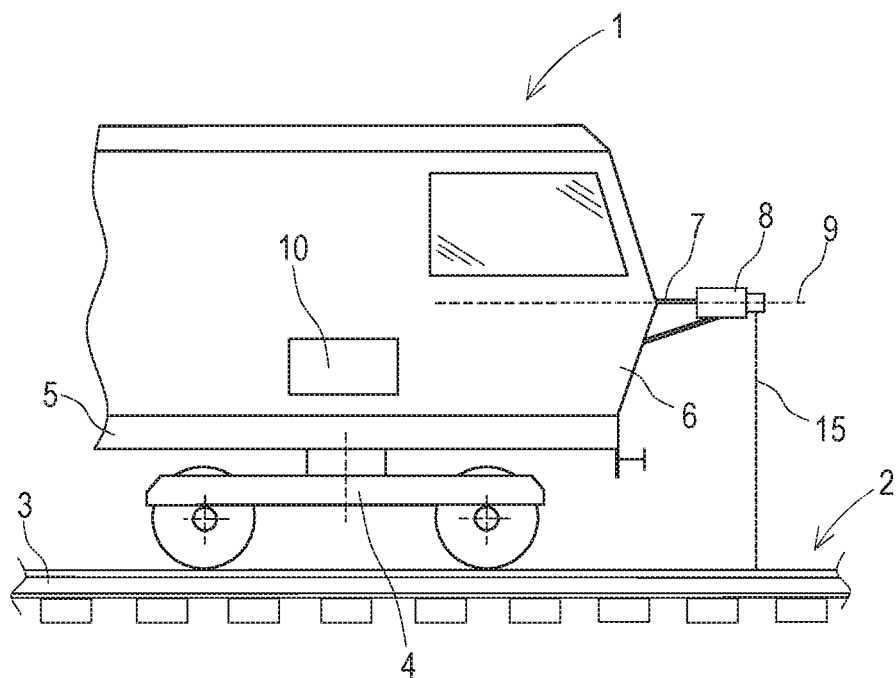
FIG. 1 side view of rail vehicle
FIG. 2 top view in a track curve
FIG. 3 front view of the rail vehicle in the track curve
FIG. 4 front view of the rail vehicle in a track super-elevation

FIG. 1 shows a simplified representation of a rail vehicle 1 for continuous contactless recording of a track geometry of a track 2, having on-track undercarriages 4 designed as bogies and mobile on rails 3 and, supported thereon, a vehicle frame 5 including a superstructure 6. A laser scanner 8 is arranged on a mounting frame 7 centrally on a front of the superstructure 6. The vehicle frame 5 including the superstructure 6 forms a platform from which the measurements take place by means of the laser scanner 8. Advantageously, the laser scanner 8 is designed as a rotating laser which rotates about a laser scanner axis 9 and scans the track 2 perpendicularly to said axis. A line scanner oriented downwards can also be used. An evaluation device 10 for computation of measurement results is arranged in the rail vehicle 1.

Optionally, further measuring devices (for example, laser line scanners directed towards the rails 3) are arranged on the on-track undercarriages 4 to detect the slight movements of the pivot points 13 relative to the track 2.

These detected movements are compensated in the computations carried out by means of the evaluation device 10.

Figure 2:
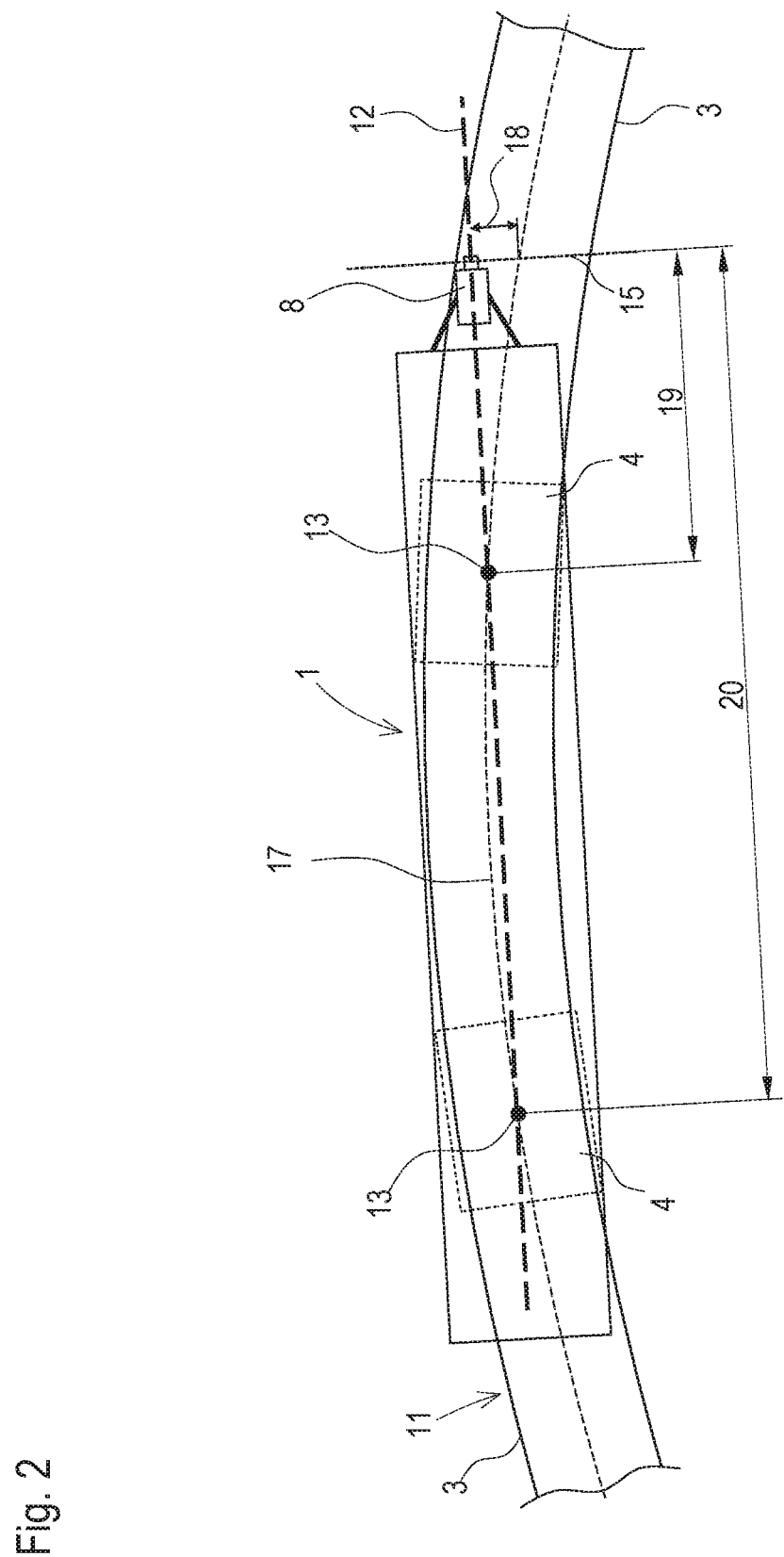

FIG. 2 shows a simplified top view of the rail vehicle 1 in a track curve 11. As a reference base 12, a reference plane is aligned with the laser scanner 8 and with pivot points 13 of the on-track undercarriages 4. In the top view, the reference plane—in the absence of a vehicle inclination—appears as a longitudinal axis through the pivot points 13 and the laser scanner axis 9. By means of a rotating laser beam of the laser scanner 8, profile data of the track 2 are recorded in a recording plane 15 extending perpendicularly to the reference plane. In said recording plane 15, an inner rail edge point 16 of the respective rail 3 is scanned in each case.

By means of familiar evaluation methods such as pattern recognition, the evaluation device 10 recognizes the typical rail cross-section in the recorded profile data and determines by means of the rail edge points 16 the position of the track center axis 17. For example, a coordinate system defined by the reference plane and recording plane 15 is defined in order to store the determined points by ways of their coordinate values. In a next step, a displacement 18 of the reference plane 12 with respect to the track center axis 17 is determined. In the simplest case, this is the horizontal distance between the reference plane and the track center axis 17 along the recording plane 15.

The combination of longitudinal axis and the displacement 17 is used like a measuring chord in combination with a versine in order to determine a curvature or a curvature radius of the track curve 11. In this, a simple geometric relationship between the curvature, the displacement and the unvarying distances 19, 20 between the pivot points 13 and the laser scanner 8 is employed.

Figure 3:
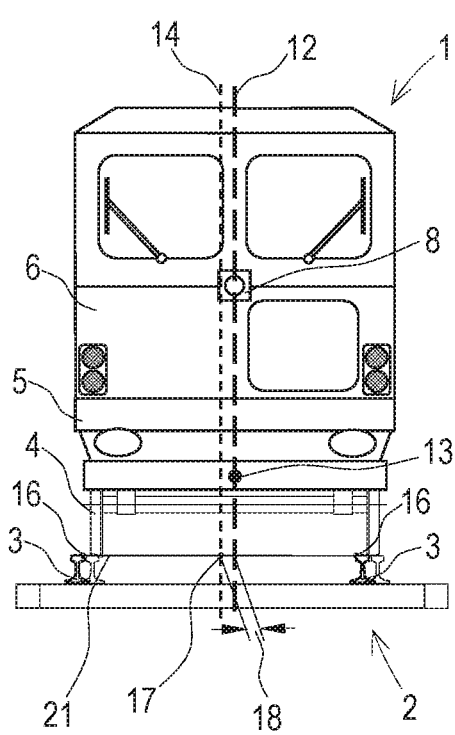

FIG. 3 shows a front view of the rail vehicle 1 with centrally arranged laser scanner 8 during travel in a curve. The track profile in the recording plane 15 is executed in full lines. The on-track undercarriage 4 is shown in thin dotted lines in a plane lying behind. The reference plane extends as a reference base 12 through the laser scanner 8 and the pivot points 13. The recorded rail edge points 16 define a horizontal plane 21 of the track 2. A vertical reference plane 14 is specified symmetrically between the rail edge points 16. In a plane straight track 2, the laser scanner 8 is situated precisely above the track center axis 17. In the track curve 11, the laser scanner 8 now shifts with respect to the track center axis 17, and the displacement 18 of the reference plane relative to the vertical reference plane 14 is computed from the profile data.

Figure 4:
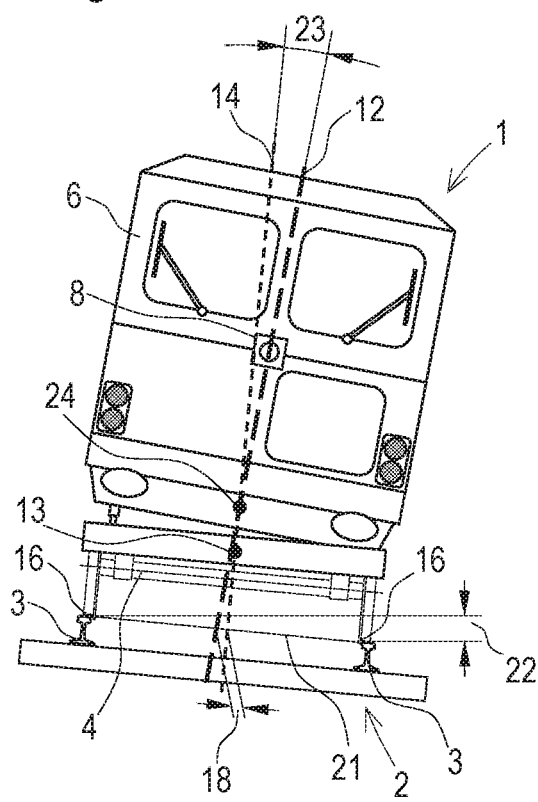

FIG. 4 shows the rail vehicle 1 in a track super-elevation 22. Super-elevations 22 are clearly differentiated from a track curve 11 because the superstructure 6 of the rail vehicle 1 leans inward as a result of a spring suspension at the bogies 4. In the example of embodiment, the reference plane (reference base 12) tilts at an inclination angle 23. At slow speeds, said inclination angle 23 and the position of an inclination axis 24 are pre-defined in dependence on a track super-elevation since dynamic influences can be neglected. In this, also the displacement 18 along the horizontal plane 21 caused by the inclination is pre-defined.

For determining a track super-elevation 22, an inclination of the superstructure 6 is detected first. This takes place, for example, by way of an evaluation of the profile data, wherein an inclined angle of view of the laser scanner 8 is deduced by calculation from a distortion of the rail profiles. A more precise determination of the inclination angle 23 takes place by means of an optional inclination sensor. In the evaluation device 10, the pre-set inclination angles 23 in dependence on the track super-elevation 22 are stored in the shape of a chart or as a function. By comparison to the detected inclination, the currently existing track super-elevation can be determined.

If, in the case of a detected inclination of the superstructure 6, the determined displacement 18 does not correspond to the displacement specified as a result of the inclination, this can be ascribed to the presence of a track curve 11. Then, for computing the curvature of the track 2, the difference between the detected displacement 18 and the displacement pre-defined as a result of the inclination is used.

The invention claimed is:

1. A method for contactless recording of a track geometry of a track by means of a rail vehicle which is moved along the track on on-track undercarriages comprising the steps of:
   compiling profile data of the track extending in transverse direction by means of a laser scanner;
   evaluating the profile data by means of an evaluation device, wherein the profile data are evaluated relative to a reference base pre-defined on the rail vehicle;
   deriving from the profile data a course of a track central axis and/or a rail;
   specifying a reference plane aligned with pivot points of the on track undercarriages;

using the laser scanner to define a reference base;
displacing the reference plane relative to a rail edge point by using the profile data;
deriving a track curve based upon the profile data, and from the distances between the pivot points and the laser scanner.

2. The method according to claim 1, further comprising the step of continuously recording the position of the pivot points of the on-track undercarriages relative to the rails of the track.

3. The method according to claim 1, wherein the reference plane is specified as a plane through a laser scanner axis and through the pivot points.

4. The method according to claim 3, further comprising the step of determining the position of a rail edge point for each rail, and
determining from this the displacement of the reference plane relative to the track center axis.

5. The method according to claim 1, wherein a reference plane of the track determined by rail edge points is prescribed, and that a track super-elevation is derived from a deviation of the reference base from said reference plane.

6. The method according to claim 5, wherein a vertical plane extending between the rail edge points is specified as reference plane.

7. The method according to claim 5, further comprising the step of detecting an inclination of a superstructure by means of an inclinometer.

8. A rail vehicle for continuous contactless recording of a track geometry of a track, comprising:

a laser scanner, arranged on the rail vehicle, for the recording of profile data of the track extending in the transverse direction,
an evaluation device coupled to the rail vehicle, wherein the evaluation device is configured for carrying out a method for contactless recording of the track geometry of a track by means of the rail vehicle which is moved along the track on on-track undercarriages comprising the steps of:
compiling profile data of the track extending in transverse direction by means of the laser scanner;
evaluating the profile data by means of the evaluation device, wherein
the profile data are evaluated relative to a reference base pre-defined on the rail vehicle;
deriving from the profile data a course of a track central axis and/or a rail;
specifying a reference plane aligned with pivot points of the on track undercarriages;
using the laser scanner to define a reference base;
displacing the reference plane relative to a rail edge point by using the profile data;
deriving a track curve based upon the profile data, and from the distances between the pivot points and the laser scanner.

9. The rail vehicle according to claim 8, wherein the laser scanner is designed as an element of a laser measuring system used for further evaluations.

* * * * *